(12) United States Patent
Hampo et al.

(10) Patent No.: US 7,348,750 B2
(45) Date of Patent: Mar. 25, 2008

(54) METHOD, APPARATUS AND ARTICLE FOR LOAD STABILIZATION

(75) Inventors: Richard J. Hampo, Plymouth, MI (US); Venkatapathi R. Nallapa, West Bloomfield, MI (US); Franz Prenner, Sindelfingen (DE)

(73) Assignee: Continential Automotive Systems US, Inc., Auburn Hills, MI (US)

( * ) Notice: Subject to any disclaimer, the term of this patent is extended or adjusted under 35 U.S.C. 154(b) by 396 days.

(21) Appl. No.: 11/003,143

(22) Filed: Dec. 3, 2004

(65) Prior Publication Data

US 2006/0119306 A1    Jun. 8, 2006

(51) Int. Cl.
   *G05B 5/01*    (2006.01)
(52) U.S. Cl. .................................... 318/623
(58) Field of Classification Search ................. 318/623
   See application file for complete search history.

(56) References Cited

U.S. PATENT DOCUMENTS

| | | | |
|---|---|---|---|
| 5,528,445 A * | 6/1996 | Cooke et al. .................. | 361/20 |
| 6,603,672 B1 | 8/2003 | Deng et al. .................... | 363/37 |
| 6,636,429 B2 | 10/2003 | Maly et al. ................... | 361/818 |
| 6,793,502 B2 | 9/2004 | Parkhill et al. ................ | 439/66 |
| 6,844,701 B2 | 1/2005 | Chen et al. ................... | 318/825 |
| 6,845,017 B2 | 1/2005 | Ahmed et al. ............... | 361/775 |
| 6,936,991 B2 * | 8/2005 | Chen et al. ................... | 318/700 |
| 2002/0034088 A1 | 3/2002 | Parkhill et al. .............. | 363/144 |
| 2002/0167828 A1 | 11/2002 | Parkhill et al. .............. | 363/144 |
| 2003/0113600 A1 | 6/2003 | Wardrop et al. ............... | 429/23 |
| 2003/0164028 A1 | 9/2003 | Chen et al. .................... | 73/116 |
| 2005/0083714 A1 | 4/2005 | Zhu et al. ...................... | 363/17 |

OTHER PUBLICATIONS

U.S. Appl. No. 10/738,926, filed Dec. 16, 2003, Maly et al.
U.S. Appl. No. 10/861,319, filed Jun. 4, 2004, Zhu.
U.S. Appl. No. 60/233,992, filed Sep. 20, 2000, Parkhill et al.
U.S. Appl. No. 60/233,993, filed Sep. 20, 2000, Ahmed et al.
U.S. Appl. No. 60/233,994, filed Sep. 20, 2000, Parkhill et al.
U.S. Appl. No. 60/233,995, filed Sep. 20, 2000, Parkhill et al.
U.S. Appl. No. 60/233,996, filed Sep. 20, 2000, Parkhill et al.
U.S. Appl. No. 60/471,387, filed May 16, 2003, Flett et al.
U.S. Appl. No. 60/560,755, filed Jun. 4, 2004, Chen et al.
U.S. Appl. No. 60/592,776, filed Jul. 30, 2004, Nallapa.

* cited by examiner

*Primary Examiner*—Lincoln Donovan
*Assistant Examiner*—Erick Glass (57) ABSTRACT

A system, method, and article for protecting a power source for a machine from sudden changes in load. In one embodiment, energy is wasted in a winding of a motor in response to a decrease in a load presented to the power source.

31 Claims, 6 Drawing Sheets

FIG. 6

METHOD, APPARATUS AND ARTICLE FOR LOAD STABILIZATION

BACKGROUND OF THE INVENTION

1. Field of the Invention

This disclosure generally relates to load stabilization for machines powered by fuel cells.

2. Description of the Related Art

The "fuel" powering an alternating current ("AC") machine, such as a field-oriented induction motor, is current. This current may be divided into two components, torque current and flux current. Torque current may be viewed as that component of the current which generates motive force, or torque. Flux current may be viewed as that component of the current which generates magnetic flux in the rotor of the machine. Torque and flux currents in induction motors are discussed in more detail in co-pending U.S. patent application Ser. No. 10/345,872 filed Jan. 15, 2003, which is entitled Overmodulation Systems and Methods For Induction Motor Control and which published on Sep. 4, 2003 under Publication No. 20030164028, and in a February 1998 publication by Texas Instruments Europe bearing Literature No. BPRA073 and entitled *Field Oriented Control of 3-Phase AC-Motors*, which are incorporated herein by reference in their entirety.

AC machines, such as induction motors and/or generators, are often employed in electric and hybrid vehicles, which typically employ fuel cells, batteries and/or super- or ultra-capacitors as a power source. Current is supplied to windings through a power subsystem, typically comprising an inverter. Power subsystems typically employ power semiconductor devices, such as insulated gate bipolar transistors (IGBTs), metal oxide semiconductor field effect transistors (MOSFETs), and/or semiconductor diodes.

Fuel cells, batteries and/or super- or ultra-capacitors can be sensitive to sudden changes in load, which can result in a reduction in the performance and/or long-term life of a fuel cell stack, battery array and/or super- or ultra-capacitor arrays. Accordingly, it can be appreciated that there is a need for a system and method for stabilizing a load presented to a fuel cell stack, a battery array, and/or a super- or ultra-capacitor array.

BRIEF SUMMARY OF THE INVENTION

In one aspect, a control system for controlling a machine comprises: a current control subsystem to generate current control signals to control a flux current provided to a winding of the machine; and a load stabilization control subsystem communicatively coupled to the current control subsystem, and configured to generate a control signal to adjust the flux current provided to the winding to stabilize a load presented by the machine.

In another aspect, an AC machine comprises: a rotor; and a control system for controlling the AC machine, the control system comprising: a current control subsystem to generate current control signals to control a flux current provided to a winding of the machine; and a load stabilization control subsystem communicatively coupled to the current control subsystem, wherein the load stabilization control subsystem is configured to: monitor a signal corresponding to a load presented by the machine; and selectively generate a control signal to adjust the flux current provided to the winding based at least in part on the monitored signal.

In another aspect, a control system for a machine comprises: a first bi-directional limiter comprising: a first input to receive a signal corresponding to a desired energy-wasting component of a flux current; a second input to receive a signal corresponding to a lower limit on the energy-wasting component of the flux current; a third input to receive a signal corresponding to an upper limit on the energy-wasting component of the flux current; and a first output; and a proportional and integral regulator comprising: a fourth input electrically coupled to the first output; a fifth input to receive a signal for controlling a proportional gain of the proportional and integral regulator; a sixth input to receive a signal for controlling an integral gain of the proportional and integral regulator; and a second output.

In another aspect, a control system for a machine comprises: a first signal combiner comprising: a first input to receive a signal corresponding to a speed of the machine; a second input to receive a signal corresponding to an estimated torque of the machine; and a first output; a first low-pass filter comprising: a third input electrically coupled to the first output; a fourth input to receive a signal corresponding to a first time constant; and a second output; an adder comprising: a fifth input electrically coupled to the second output; a sixth input to receive a signal corresponding to a loss of the machine; a seventh input to receive a signal corresponding to a commanded energy-wasting flux current; and a third output; a first bi-directional limiter comprising: an eighth input electrically coupled to the third output; a fourth output; a ninth input to receive a signal corresponding to an upper limit on the fourth output; and a tenth input to receive a signal corresponding to a lower limit on the fourth output; a proportional and integral regulator comprising: an eleventh input electrically coupled to the fourth output; a fifth output; a twelfth input to receive a signal for controlling a proportional gain of the proportional and integral regulator; and a thirteenth input to receive a signal for controlling an integral gain of the proportional and integral regulator; and a second bi-directional limiter comprising: a fourteenth input electrically coupled to the fifth output; a sixth output; a fifteenth input to receive a signal corresponding to a lower limit on the sixth output; and a sixteenth input corresponding to an upper limit on the sixth output.

In another aspect a method of stabilizing a load presented by a machine comprises: receiving an indication that load stabilization is desired; and controlling a flux current provided to a winding of the machine based at least in part on the received indication that load stabilization is desired.

In another aspect, a system for stabilizing a load presented by a machine comprises: means for determining whether load stabilization is desired; and means for wasting energy in a winding of the machine communicatively coupled to the means for determining whether load stabilization is desired.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments. However, one skilled in the art will understand that the present systems and methods may be practiced without these details. In other instances, well-known structures associated with AC machines, induction motors, fuel cell stacks, power subsystems, controllers and/or gate drivers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearance of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
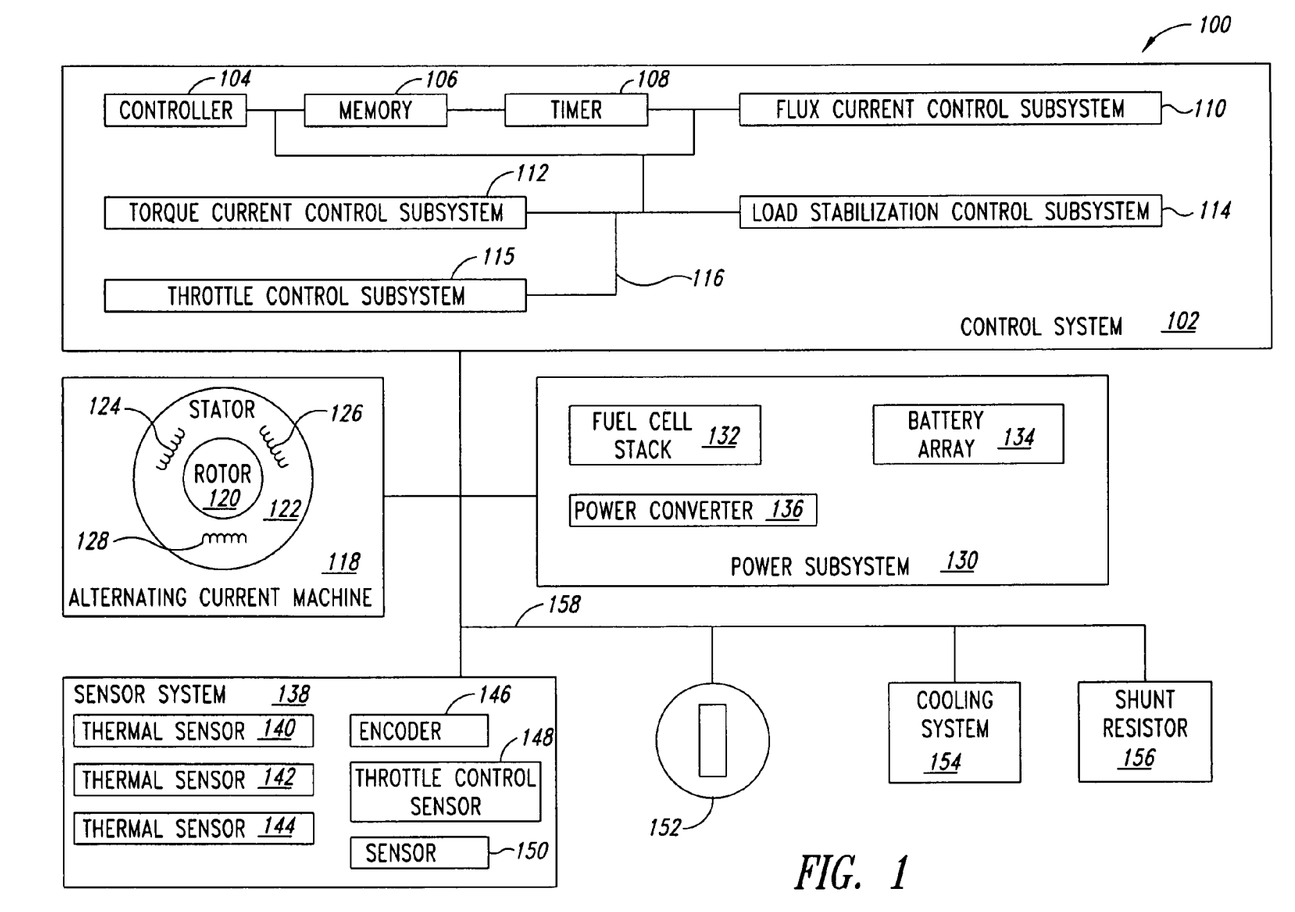
FIG. 1 is a functional block diagram of a system incorporating an embodiment of a load stabilization control subsystem.

FIG. 1 is a functional block diagram of a system 100 implementing an embodiment of a load stabilization strategy according to the present systems and methods. The system 100 may be embodied in an AC machine, such as an electric traction motor of an electric and/or hybrid motor vehicle, which may be operable to perform regenerative braking.

The system 100 comprises a control system 102, which controls operation of the system 100. The control system 102 may take the form of one or more processors, microcontrollers, firmware, subsystems, or other circuitry and components or combinations thereof, with or without associated memory.

In the embodiment illustrated in FIG. 1, the control system 102 comprises a controller 104, a memory 106, a timer 108, a flux current control subsystem 110, a torque current control subsystem 112, a load stabilization control subsystem 114, a throttle control subsystem 115, and a control system bus 116. The control system bus 116 may comprise a power bus, control bus, and status signal bus in addition to a data bus. For the sake of clarity, however, the various control system buses are illustrated in FIG. 1 as the control system bus 116.

The control system 102 may be implemented in a variety of ways, including as separate subsystems. The control system 102 may be implemented as a microprocessor, a digital signal processor (DSP), an application-specific integrated circuit (ASIC), a gate-driver board, or the like, or as a series of instructions stored in a memory, such as the memory 106 and executed by a controller, such as the controller 104, or various combinations of the above. Thus, software modifications to existing hardware may allow the implementation of the control system 102. Various subsystems, such as the load stabilization control subsystem 114, are identified as separate blocks in the functional block diagram of FIG. 1 because they perform specific functions that will be described in more detail below. These subsystems may not be discrete units but may be functions of a software routine, which will probably, but not necessarily, be separately callable and hence identifiable elements. The various subsystems may be combined. For example, all or portions of the load stabilization control subsystem 114 may be integrated into the flux current control subsystem 110.

While the illustrated embodiment denotes a single controller 104, other embodiments may comprise multiple controllers. The memory 106 may comprise, for example, registers, read only memory ("ROM"), random access memory ("RAM"), flash memory and/or electronically erasable programmable read only memory ("EEPROM"), and may provide instructions and data for use by the control system 102.

The illustrated embodiment of the system 100 comprises an AC machine 118 comprising a rotor 120 and a stator 122, the stator comprising three windings 124, 126, 128. As discussed in more detail below, in an exemplary embodiment one or more of the windings 124, 126, 128 may be comprised of heavy-duty coils.

The illustrated embodiment of the system 100 comprises a power subsystem 130 comprising a fuel cell stack 132, a battery array 134 and a power converter 136. The power subsystem 130 provides power to the system 100.

The flux current control subsystem 110 and the torque current control subsystem 112 generate control signals to control current provided to the windings 124, 126, 128 by the power subsystem 130.

The illustrated embodiment of the system 100 comprises a sensor system 138 comprising three thermal sensors 140, 142, 144, an encoder 146, a throttle control sensor 148 and an additional sensor 150. The sensor system 138 senses various conditions of the system 100, such as temperatures inside and/or outside the power subsystem 130 and/or the windings 124, 126, 128, angular movement of the rotor 120, or levels of various control signals, such as levels of control signals generated by the torque current control subsystem 112, the throttle control subsystem 115, or the power subsystem 130. The exact components and configuration of the sensor system 138 may vary based on the particular application. For example, the sensor system 138 may only have one thermal sensor and may have two or more encoders instead of three thermal sensors and one encoder as illustrated. The memory 104 may store a history of data collected by the sensor system 138.

The system 100 also includes a keyed switch 152, a cooling system 154 and a shunt resistor 156. As discussed in more detail below, the load stabilization control subsystem 114 generates control signals to control energy wasting so as to even a load presented to a power source, such as a fuel cell stack, an array of batteries, and/or an array of super- or ultra-capacitors. Various components of the system 100 are coupled together by a bus system 158 which may include a power bus, control bus, and status signal bus in addition to a data bus. The bus system 158 may comprise an industry standard bus system, such as a controller area network ("CAN"). For the sake of clarity, however, the various buses are illustrated in FIG. 1 as the bus system 158.

Energy can be wasted by increasing a flux current beyond the amount that would otherwise be employed. Normally, the relationship between a flux current and a torque current is controlled so as to maximize the torque produced and/or the efficiency of an AC machine, such as the machine 118 illustrated in FIG. 1. A flux current in excess of the amount required for efficient operation may generate excess heat in the machine 118 and/or the power subsystem 130, without contributing significantly to the production of torque. This may be referred to as an energy wasting protocol.

In response to an indication that a load presented to the power subsystem 130 is changing and/or is likely to change, the load stabilization control subsystem 114 selectively generates control signals to initiate or adjust energy wasting in order to stabilize the load. For example, the load stabilization control subsystem 114 may selectively generate control signals to cause the flux current control subsystem 110 to generate control signals increasing the amount of flux current provided to one or more windings, such as windings 124, 126, 128, by the power subsystem 130 in response to an indication that the load presented to the power subsystem 130 is decreasing. The load stabilization control subsystem 114 may generate control signals to waste energy in other ways and may combine energy wasting techniques. For example, the load stabilization control subsystem 114 may selectively generate control signals to couple the shunt resistor 156 to the power subsystem 130.

Figure 2:
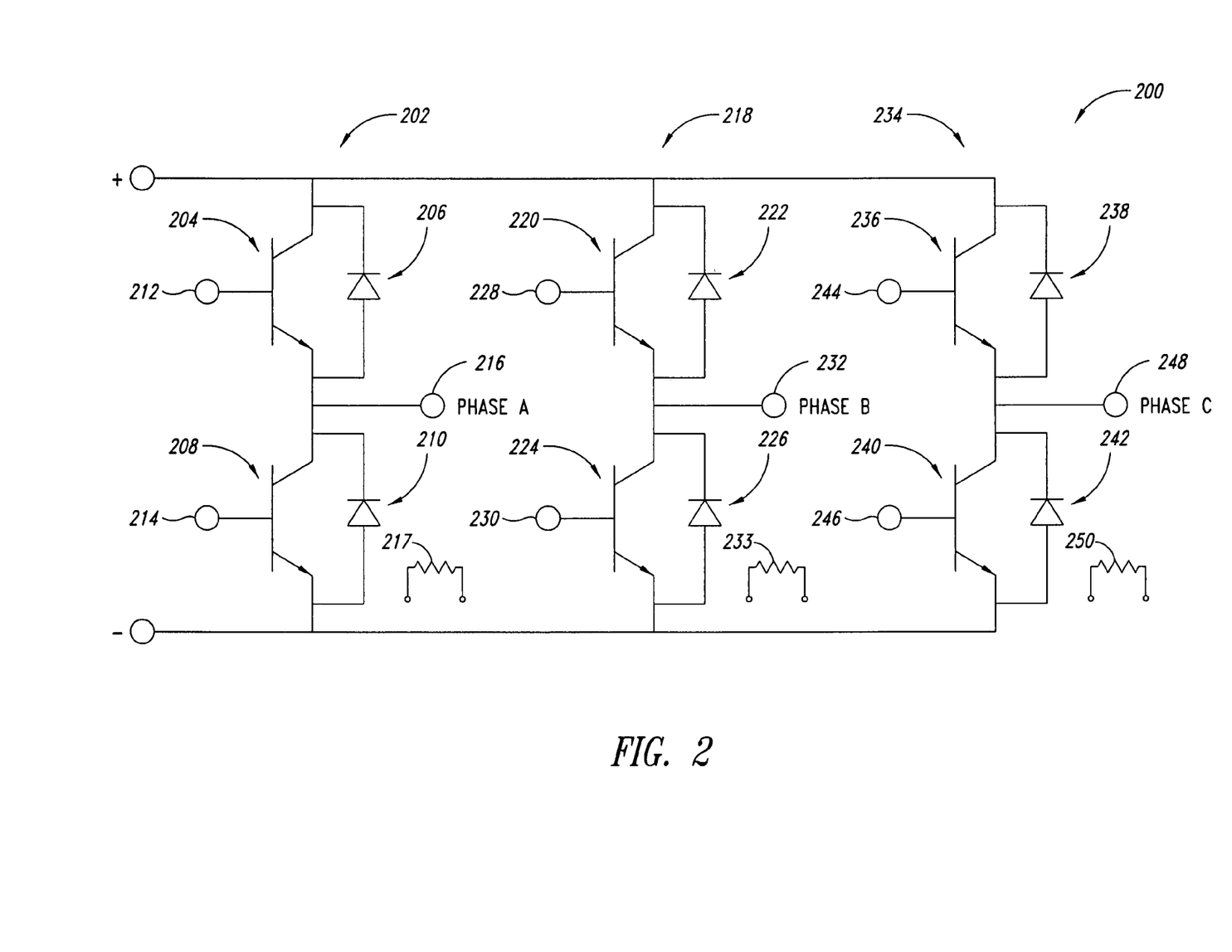
FIG. 2 is a schematic view of a three-phase inverter that can be employed in a power subsystem in the system of FIG. 1.

FIG. 2 is a schematic diagram of an embodiment of an inverter circuit 200 suitable for use in a power subsystem, such as the power subsystem 130 illustrated in FIG. 1. The inverter circuit 200 comprises a first leg 202 comprising a first power transistor 204, a first diode 206, a second power transistor 208 and a second diode 210. The first and second power transistors 204, 208 comprise respective control terminals 212, 214, which may receive control signals from, for example, a flux current control subsystem such as the flux current control subsystem 110 illustrated in FIG. 1. The first leg 202 has an output terminal 216, which may supply current to a winding in a first mode of operation, such as winding 124 illustrated in FIG. 1. The first leg 202 also has a thermal sensor 217 for sensing temperatures inside and/or outside the first leg 202.

The inverter circuit 200 comprises a second leg 218 comprising a third power transistor 220, a third diode 222, a fourth power transistor 224 and a fourth diode 226. The third and fourth power transistors 220, 224 comprise respective control terminals 228, 230, which may receive control signals from, for example, a load stabilization control subsystem such as the load stabilization control subsystem 114 illustrated in FIG. 1. The second leg 218 has an output terminal 232, which may supply current to a winding in a first mode of operation, such as winding 126 illustrated in FIG. 1. The second leg 218 also has a thermal sensor 233 for sensing temperatures inside and/or outside the second leg 218.

The inverter comprises a third leg 234 comprising a fifth power transistor 236, a fifth diode 238, a sixth power transistor 240 and a sixth diode 242. The fifth and sixth power transistors 236, 240 comprise respective control terminals 244, 246, which may receive control signals from, for example, a torque current control subsystem such as the torque current control subsystem 112 illustrated in FIG. 1. The third leg 234 has an output terminal 248, which may supply current to a winding in a first mode of operation, such as winding 128 illustrated in FIG. 1. The third leg 234 also has a thermal sensor 250 for sensing temperatures inside and/or outside the third leg 234.

The particular components selected for the inverter circuit 200 may vary based upon a particular application. As discussed in more detail below, the components comprising one leg of the inverter circuit, for example the first leg 202, may be sized to handle a larger load than the components in other legs of the inverter circuit 200.

Figure 3:
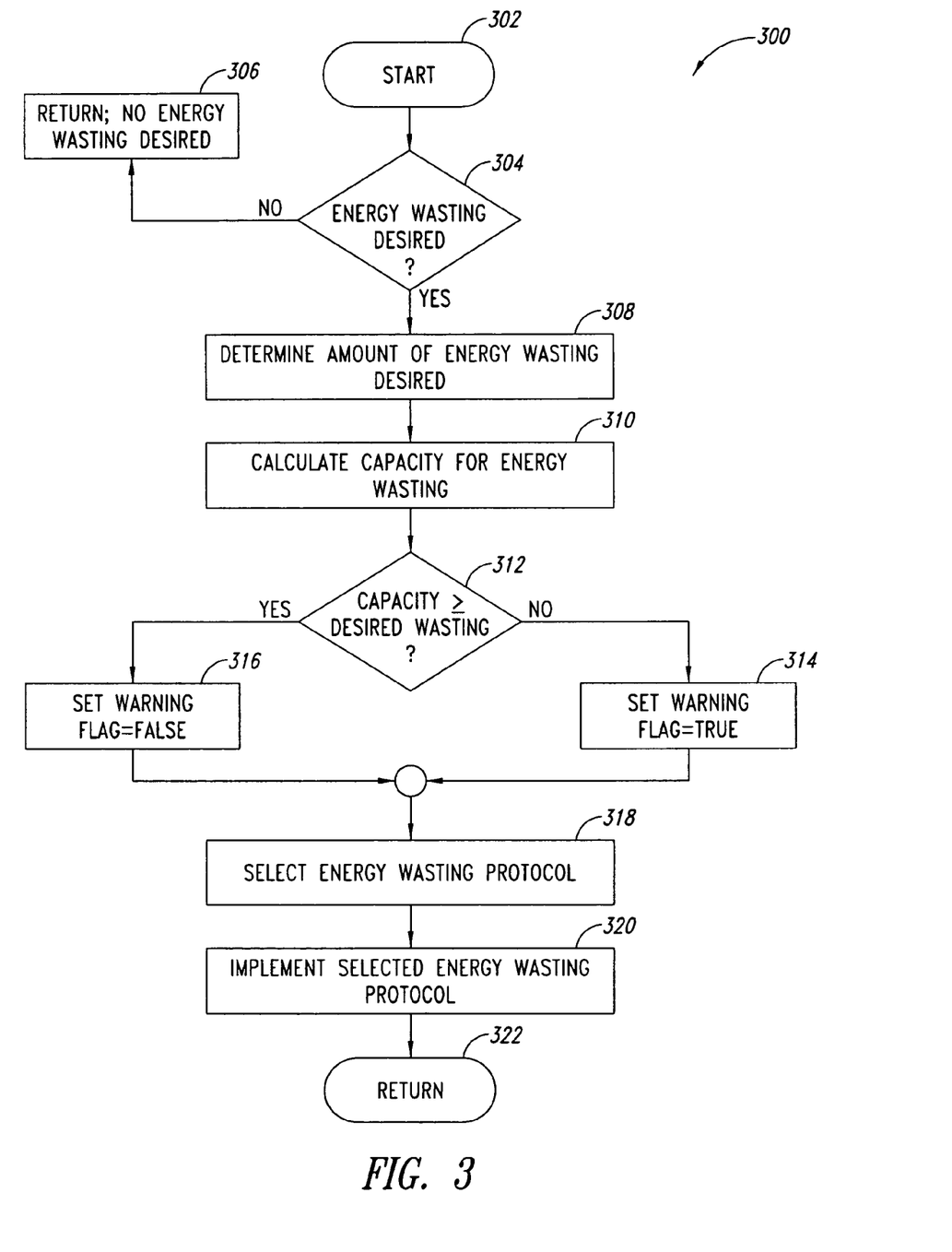
FIG. 3 is a flow diagram illustrating operation of an embodiment of a load stabilization subroutine.

FIG. 3 is a flow diagram for the operation of a load stabilization subroutine 300 that can be employed by a load stabilization control subsystem, such as the load stabilization control subsystem 114 of system 100 illustrated in FIG. 1, to minimize fluctuations in a load presented to a power subsystem, such as the power subsystem 130 illustrated in FIG. 1, by controlling energy wasting.

The subroutine 300 illustrated in FIG. 3 may be called in response to commands issued by a control system, such as the control system 102 illustrated in FIG. 1, which may, for example, issue commands to call the subroutine 300 on a periodic basis or in response to signals received from a sensor system, such as the sensor system 138. For example, a control system could issue commands to run the subroutine 300 on a periodic basis, such as every 10 milliseconds, or in response to sensor inputs suggesting that a sudden change in load conditions is occurring or is likely to occur. For example, a change in a signal from a throttle control, such as the throttle control subsystem 115 illustrated in FIG. 1, might indicate that a sudden change in a load presented to a power subsystem, such as the power subsystem 130 illustrated in FIG. 1, can be expected.

The load stabilization subroutine 300 starts at 302. At 304, the subroutine 300 determines whether energy wasting is desired in order to stabilize a load presented to a power source, such as a fuel cell stack, a battery array, and/or a super- or ultra-capacitor array. The specific indications that will determine whether energy wasting is desired to stabilize a load may vary based upon a particular application. The decision may depend, for example, on a setting or a change in a setting, such as a setting of a throttle control, such as the throttle control subsystem 115 of FIG. 1. In another example, the decision may depend upon whether a measured change in a load presented to a power subsystem, such as the power subsystem 130 illustrated in FIG. 1, exceeds a threshold level, such as 200 watts. The load stabilization subroutine 300 may call another subroutine to determine whether energy wasting is desired, such as the subroutine illustrated in FIG. 4 and discussed in more detail below.

If the answer at 304 is NO, the subroutine 300 returns an indication at 306 that no energy wasting is desired, and may return the value of any other desired variables as well, such as a result of an interim calculation used to determine whether energy wasting is desired.

If the answer at 304 is YES, the subroutine 300 proceeds to 308, where the subroutine 300 determines the amount of energy wasting desired. The specific criteria that will determine the amount of energy wasting desired may vary based upon a particular application. The amount of energy wasting desired may depend, for example, on a setting or a change in a setting, such as a setting of a throttle control, such as the throttle control subsystem 115 illustrated in FIG. 1. In another example, the amount of energy wasting desired may depend upon a measured change in a load presented to a power subsystem, such as the power subsystem 130 illustrated in FIG. 1. The amount of energy wasting desired also may depend on a pre-set or a calculated threshold value, which may be selected so as to avoid power limits on components of the system 100 or to reduce the likelihood of an unstable or oscillating condition. The load stabilization subroutine 300 may call another subroutine to determine the amount of energy wasting desired.

The subroutine 300 proceeds from 308 to 310 where it calculates the available capacity for energy wasting. The calculated capacity for energy wasting may depend upon a number of factors, including an operational mode of the system 100, such as whether the system 100 is operating in a Limited Operation Strategy ("LOS") mode, the total power loss of the system 100, including copper and iron losses, an estimated or measured rotor speed, an estimated rotor torque, whether the system 100 is restricting output torque or speed, a status of a system, such as the cooling system 154 illustrated in FIG. 1, information from a sensor system, such as the sensor system 138 illustrated in FIG. 1, and/or threshold values, such as a limit on the amount by which the flux current can be increased and minimum and maximum flux current levels. The system 100 might operate in an LOS mode, for example, in response to detection of a failed encoder during operation, such as the encoder 146 illustrated in FIG. 1.

The subroutine 300 proceeds from 310 to 312 where it determines whether the calculated capacity for energy wasting (calculated at 310) is greater than or equal to the amount of energy wasting desired (determined at 308).

If the answer at 312 is NO, the subroutine 300 proceeds from 312 to 314. At 314 a warning flag is set to TRUE to indicate that the amount of energy wasting desired exceeds the calculated capacity for energy wasting. The subroutine 300 then proceeds from 314 to 318.

If the answer at 312 is YES, the subroutine 300 proceeds from 312 to 316. At 316, the warning flag is set to FALSE to indicate that the amount of energy wasting desired does not exceed the calculated capacity for energy wasting. The subroutine 300 then proceeds from 316 to 318.

At 318, the subroutine 300 selects an energy wasting protocol to be implemented. The selection may depend on a number of factors, including sensor outputs and control settings, the setting of the warning flag, the desired amount of energy wasting, the calculated capacity for energy wasting and/or the factors used to determine the desired amount of energy wasting or to calculate the capacity for energy wasting. The energy wasting protocol selected may include energy wasting in one winding, such as winding 124 illustrated in FIG. 1, energy wasting in multiple windings, such all three windings 124, 126, 128 illustrated in FIG. 1, energy wasting in a shunt resistor, such as the shunt resistor 156 illustrated in FIG. 1, and/or various combinations of energy wasting protocols. The subroutine 300 may also select not to waste any energy.

The subroutine 300 proceeds from 318 to 320, where it implements the selected energy wasting protocol. The subroutine 300 proceeds from 320 to 322, where subroutine 300 terminates and returns the value of any desired variables, such as the status of the warning flag and the value of any desired variables used or calculated in the subroutine 300.

As noted above, the subroutine 300 may select an energy wasting protocol where different amounts of energy are wasted in different windings of an AC machine. Thus, referring now to FIGS. 1 and 2, an embodiment of a system 100 might employ windings having different rated capacities, for example winding 124 might be rated to carry more power than the other two windings 126, 128. Similarly, an embodiment of the cooling system 154 might be configured to dedicate more cooling capacity to winding 124 than is dedicated to the other two windings 126, 128, and an embodiment of inverter circuit 200 may comprise first leg 202 that is configured to handle more power than second and third legs 218, 234 of inverter circuit 200. An embodiment of the cooling system 154 may be configured to dedicate more cooling capacity to first leg 202 of inverter circuit 200 than is dedicated to the second and third legs 218, 234.

Embodiments of load stabilization subroutine 300 may perform other acts not shown in FIG. 3, may not perform all of the acts shown in FIG. 3, may perform the acts of FIG. 3 in a different order or may perform various acts by calling other subroutines. For example, the subroutine 300 may be modified to set the warning flag to FALSE when a system 100 is started, the determination of the amount of energy wasting desired may occur before or at the same time as the determination of whether energy wasting is desired, or the selection and implementation of the energy wasting protocol may be combined.

Figure 4:
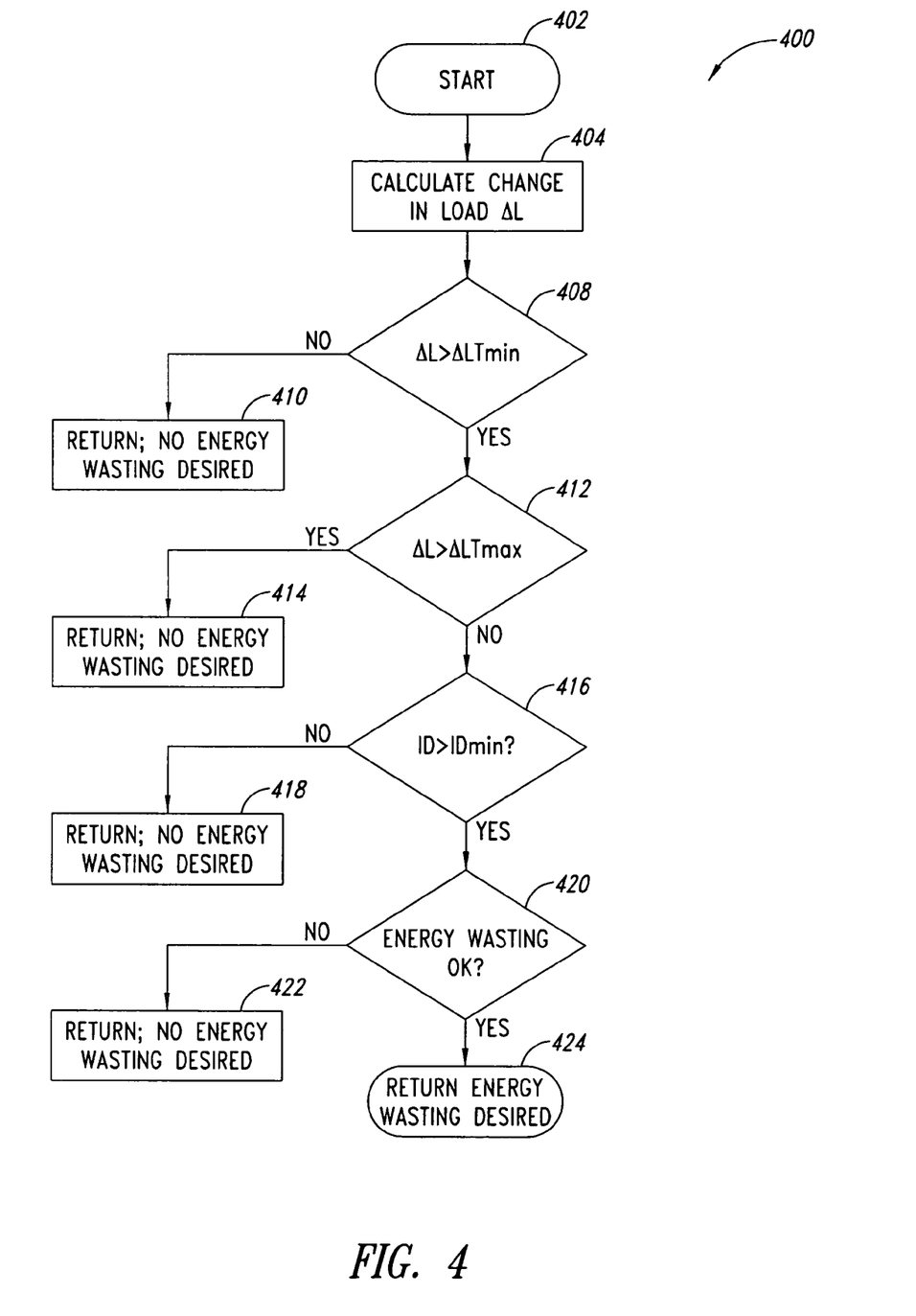
FIG. 4 is a flow diagram illustrating operation of an embodiment of a load stabilization subroutine.

FIG. 4 is flow diagram for a subroutine 400 that may be used to determine whether energy wasting is desired. The subroutine 400 may be called, for example, by a load stabilization subroutine such as the load stabilization subroutine 300 illustrated in FIG. 3.

At 402, the subroutine 400 starts and the subroutine 400 proceeds to 404. At 404 the subroutine 400 calculates a change in load, $\Delta L$. The calculated change in load $\Delta L$ may be calculated from data supplied by a sensor system, such as the sensor system 138 in FIG. 1 and/or from data related to control signals. It may correspond to an actual measured change in load over a given period of time, to an anticipated change in load over a given period of time or to a combination of an actual change in load and an anticipated change in load. For example, a sensor, such as sensor 150 in FIG. 1, may sense a load presented to a power source at a first time and at a second time. The subroutine 400 may calculate the change in load $\Delta L$ by subtracting the load sensed at a first time from the load sensed at a second time. In another example, the subroutine 400 may calculate the change in load $\Delta L$ by subtracting a previous throttle control setting, such as a setting of the throttle control subsystem 115 illustrated in FIG. 1, from a current throttle control setting. In another example, the calculated change in load may correspond to a weighted combination of a measured change in a load and a measured change in a control setting.

The subroutine 400 proceeds from 404 to 408 where it determines whether the calculated change in load $\Delta L$ exceeds a first threshold value $\Delta L T min$. If the answer at 408 is NO, the subroutine 400 proceeds from 408 to 410 where it returns an indication that no energy wasting is desired, as well as the value of any other desired variables. The first threshold value $\Delta L T min$ may be selected so as to minimize unnecessary energy wasting, such as when a calculated change in a load presented to the power source is small enough that an affect of the change in the load on the power source is minimal. It may also be selected so as to minimize the likelihood that energy wasting will contribute to the creation of an oscillating load condition. The first threshold value $\Delta L T min$ may vary based on a particular machine and intended usage. In an exemplary embodiment, the first threshold value $\Delta L T min$ is adjustable. In one embodiment, the first threshold value $\Delta L min$ may be set equal to 200 watts.

If the answer at 408 is YES, the subroutine 400 proceeds from 408 to 412, where it determines whether the calculated change in load $\Delta L$ exceeds a second threshold value $\Delta L T max$. If the answer at 412 is YES, the subroutine 400 proceeds from 412 to 414, where it returns an indication that no energy wasting is desired. The second threshold value ΔLTmax may be selected so as to minimize unnecessary energy wasting, such as when the magnitude of a calculated change in load ΔL indicates the machine 118 is being taken off-line or when the magnitude is so large that energy wasting would have a negligible impact on stabilizing a load. The value of the second threshold value ΔLTmax might also be selected to minimize the possibility that energy wasting may contribute to the creation of an oscillating load condition. The second threshold value ΔLTmax may vary based on a particular machine and intended usage. In an exemplary embodiment, the second threshold value ΔLTmax is adjustable.

If the answer at 412 is NO, the subroutine 400 proceeds from 412 to 416, where it determines whether the flux current ID is large enough to permit energy wasting. The subroutine 400 may determine whether the flux current is large enough to permit energy wasting directly, by, for example, measuring the flux current ID with a sensor system, such as the sensor system 138 illustrated in FIG. 1, and comparing the measured flux current to a threshold flux current value IDmin. In another example, the subroutine 400 may determine whether the flux current ID is large enough to permit energy wasting by comparing a command level, such as a command to generate a flux current, to a threshold command level. If the answer at 416 is NO, the subroutine 400 proceeds from 416 to 418 where it returns an indication that no energy wasting is desired, as well as the value of any desired variables. The threshold flux current value IDmin may vary based on a particular machine and intended usage. In an exemplary embodiment, the threshold value is adjustable. The threshold value can be selected so as to avoid initiating energy wasting when doing so would have a significant impact on the torque produced by the machine 118. For example, the threshold value can be selected so as to prevent the initiation of energy wasting until the machine 118 is operating in an overmodulation mode. For a motor vehicle operating under standard conditions, the threshold value might correspond to an ID current of 30 amps.

If the answer at 416 is YES, the subroutine 400 proceeds from 416 to 420, where it determines whether other operating conditions and/or settings are such that energy wasting should be permitted. If the answer at 420 is NO, the subroutine 400 proceeds from 420 to 422 where it returns an indication that energy wasting is not desired. For example, the subroutine 400 may determine whether a sensed condition, such as a thermal condition sensed by a thermal sensor, such as thermal sensor 117 of FIG. 2, exceeds a threshold, such as a threshold temperature level, indicating that energy wasting would not be safe or is otherwise undesirable. In another example, the subroutine 400 might check a status of the system 100, such as whether a cooling system is operational, such as the cooling system 154 illustrated in FIG. 1. The particular conditions to be satisfied may vary for a particular machine and intended operation, and more than one condition may be employed.

If the answer at 420 is YES, the subroutine 400 proceeds from 420 to 424, where it returns an indication that energy wasting is desired.

Embodiments of a subroutine for determining whether energy wasting is desired may perform other acts not shown in FIG. 4, may not perform all of the acts shown in FIG. 4, may perform the acts of FIG. 4 in a different order or may call one or more subroutines to perform various acts. For example, the subroutine 400 may be modified to determine whether an error flag has been set, indicating that energy wasting should not be employed. In another example, the subroutine 400 could be modified to set a second warning flag at act 418 instead of returning an indication that no energy wasting is desired. The subroutine 400 may use the second warning flag as an indication not to employ energy wasting in the windings 124, 126, 128 of the AC machine 118.

Other considerations may be addressed without disabling energy wasting. For example, a system, such as the system 100 illustrated in FIG. 1, could limit the amount of energy wasting or select a particular energy wasting protocol to address issues raised by detected temperature levels. Thus, for example, with regard to FIG. 3, the calculated capacity for energy wasting could be reduced to address concerns related to a measured temperature at 310, or the energy wasting protocol selected at 318 could be selected to address concerns related to a measured temperature.

Figure 5:
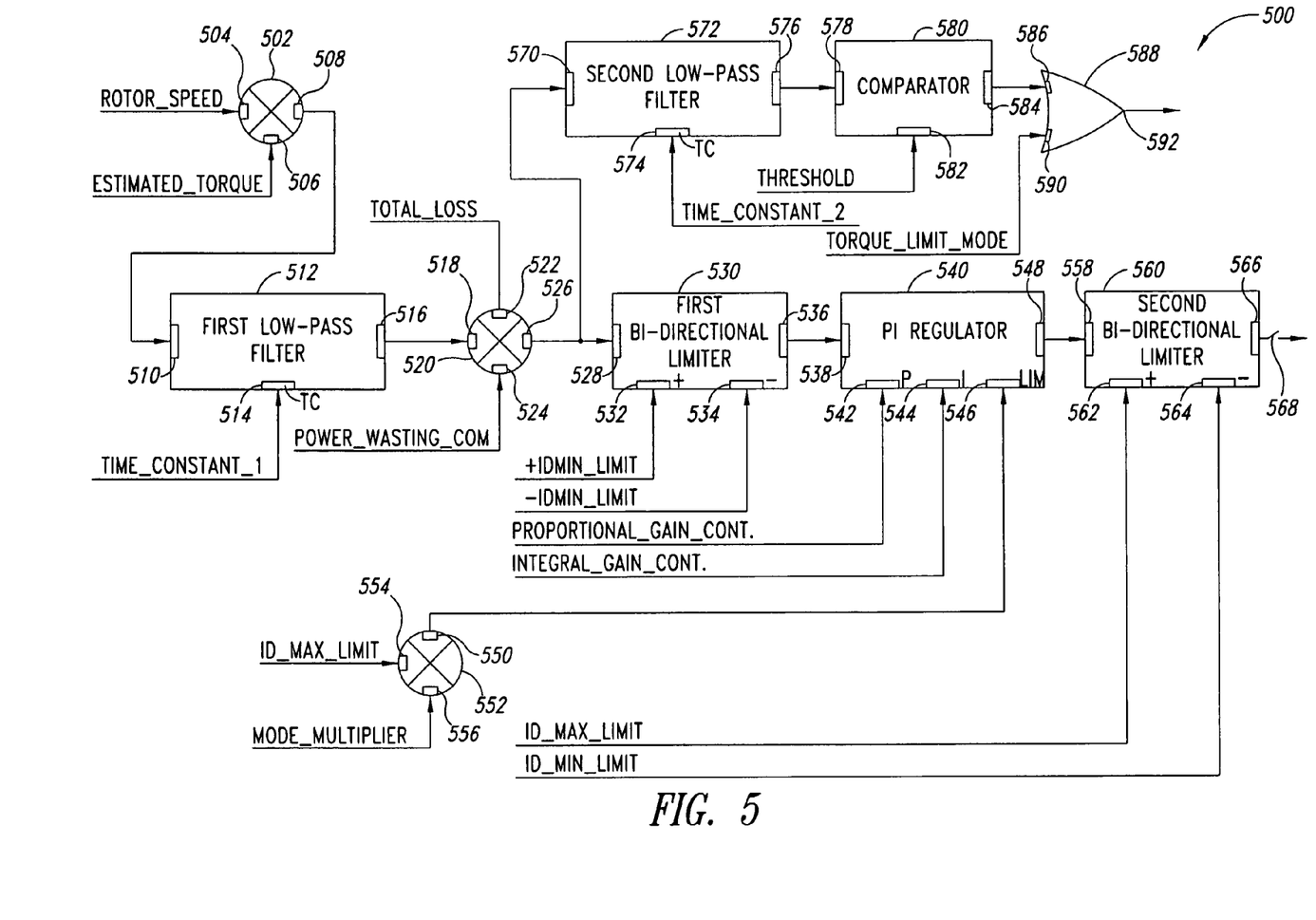
FIG. 5 is a functional block diagram of a load stabilization system.

FIG. 5 is a functional block diagram of an embodiment of a load stabilization system 500 suitable for use in a system, such as the load stabilization subsystem 114 of the system 100 illustrated in FIG. 1. The load stabilization system 500 comprises a first signal combiner 502, such as a multiplier, for receiving a signal corresponding to a measured rotor speed at a first input 504 and a signal corresponding to an estimated torque at a second input 506 and for producing an output at an output 508. The output 508 is electrically coupled to a first input 510 of a first low-pass filter 512. The first low-pass filter 512 receives a signal corresponding to a first time constant at a second input 514 of the first low-pass filter 512. The first low-pass filter 512 comprises an output 516. In an embodiment for a load stabilization system used in a vehicle, the signal corresponding to a time constant might correspond to 50 milliseconds.

The output 516 of the first low-pass filter 512 is electrically coupled to a first positive input 518 of an adder 520. The adder 520 comprises a second positive input 522 for receiving a signal corresponding to a loss of machine 118, which may include copper and iron losses. The adder 520 also comprises a negative input 524 for receiving a signal corresponding to a commanded level of power wasting and an output 526 for providing an output of the adder 520. The output of the adder 520 corresponds to an indication of a desired energy-wasting component of a flux current.

The output 526 of the adder 520 is electrically coupled to a first input 528 of a first bi-directional limiter 530. The first bi-directional limiter 530 comprises a second input 532 for receiving a signal corresponding to an upper limit of an incremental flux current, a third input 534 for receiving a signal corresponding to a lower limit of an incremental flux current, and an output 536. In one embodiment, the signal corresponding to upper limit of an incremental flux current corresponds to a power change of 200 watts of a first polarity and the signal corresponding to a lower limit of an incremental flux current corresponds to a power change of 200 watts of an opposite polarity. The upper and lower limits can be chosen so as to avoid oscillating conditions and to limit the rate of change of a flux current.

The output 536 of the first bi-directional limiter 530 is electrically coupled to a first input 538 of a proportional and integral regulator 540. The proportional and integral regulator 540 comprises a second input 542 to receive a signal for controlling a proportional gain, a third input 544 to receive a signal for controlling an integral gain, a fourth input 546 to receive a signal corresponding to an output limit and an output 548. In one embodiment, the signal for controlling the proportional gain might be set so as to produce a proportional gain of 2500 and the signal for controlling the integral gain might be set so as to produce an integral gain of 250.

The fourth input 546 of the proportional and integral regulator 540 is electrically coupled to an output 550 of a second signal combiner 552, such as a multiplier. The second signal combiner 552 comprises a first input 554 for receiving a signal corresponding to a maximum allowed flux current and a second input 556 for receiving a signal corresponding to a mode multiplier factor. In one embodiment the signal corresponding to a maximum flux current might be set so as to limit the flux current to a maximum of 400 amps. In one embodiment, the signal corresponding to a mode multiplier might correspond to a factor of one when machine 118 is operating in a first mode, such as a normal operation mode, and might correspond to a factor of ¼ if machine 118 is operating in a second mode, such as an LOS mode.

The output 548 of the proportional and integral controller 540 is electrically coupled to a first input 558 of a second bi-directional limiter 560. The second bi-directional limiter 560 comprises a second input 562 for receiving a signal corresponding to an upper limit, a third input 564 for receiving a signal corresponding to a lower limit, and an output 566. In one embodiment, the signal corresponding to an upper limit might correspond to a maximum flux current allowed and might be set so as to limit the flux current to a maximum of 400 amps. In one embodiment, the signal corresponding to a lower limit might correspond to a minimum flux current and might be set so as to limit the flux current to a minimum of 30 amps. The output 566 of the second bi-directional limiter 560 corresponds to the amount of flux current required to waste the commanded level of energy wasting, subject to certain limitations as described above, and is electrically coupled to a switch 568. The switch 568 can be opened when it is desired to disable energy wasting.

The output 526 of the adder 520 also is electrically coupled to a first input 570 of a second low-pass filter 572. The second low-pass filter 572 receives a signal corresponding to a second time constant at a second input 574. In one embodiment, the signal corresponding to a second time constant might correspond to 500 milliseconds. The second low-pass filter 572 comprises an output 576, which corresponds to a capacity of machine 118 to waste energy over a period of time corresponding to the second time constant.

The output 576 of the second low-pass filter 572 is electrically coupled to a first input 578 of a comparator 580. The comparator 580 comprises a second input 582 for receiving a threshold value to be compared to the signal received at the first input 578 of the comparator 580. In one embodiment, the threshold value might be set to a value corresponding to 200 watts of energy wasting. The comparator 580 comprises an output 584, which is a logical flag. In the embodiment illustrated in FIG. 5, the output 584 of the comparator 580 may be TRUE when the capacity of machine 118 to waste energy is below a threshold energy level. In the embodiment illustrated in FIG. 5, the output 576 of the second low-pass filter 572 may have a negative value corresponding to a positive capacity of machine 118 to waste energy. Thus, in such an embodiment the threshold value could be negative.

The output 584 of the comparator 580 is electrically coupled to a first input 586 of an OR gate 588. A second input 590 of the OR gate 588 receives a logical flag corresponding to a mode of machine 118, such as a torque limiting mode, which may also serve as an indication that machine 118 may be unable to waste a desired amount of energy. The OR gate 588 comprises an output 592, which may be used by a system, such as the system 100 illustrated in FIG. 1, to predict whether energy wasting in the windings of machine 118, such as the windings 124, 126, 128 of FIG. 1, will be sufficient to meet a desired amount of energy wasting.

Modifications can be made to the embodiment of a load stabilization system 500 illustrated in FIG. 5. For example, the output of the comparator 580 may be FALSE to indicate that the capacity of machine 118 to waste energy is insufficient to meet a commanded level of energy wasting and the OR gate 588 may be replaced with other logic components, such as a NAND gate (see FIG. 6).

Figure 6:
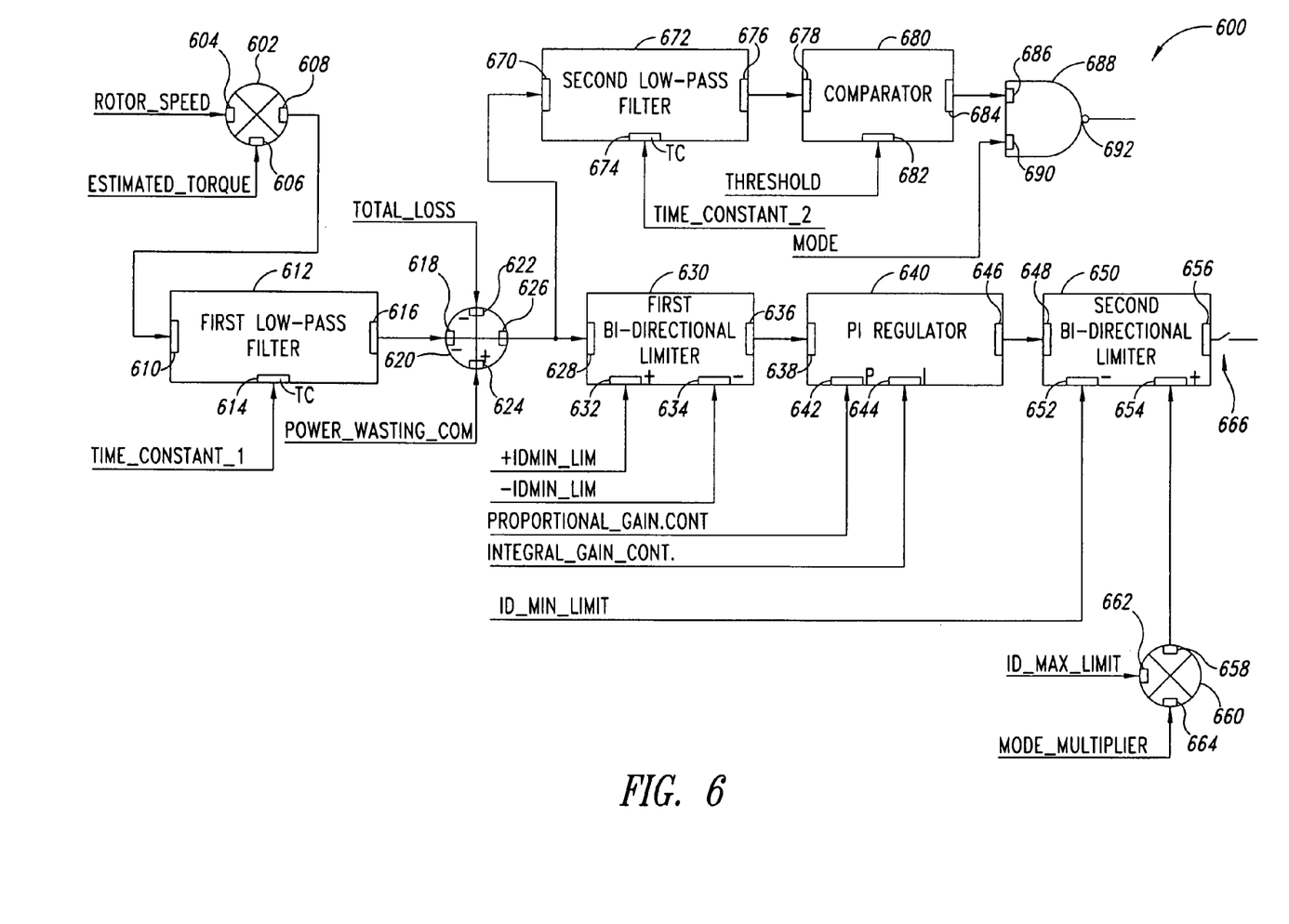
FIG. 6 is a functional block diagram of a load stabilization system.

FIG. 6 is a functional block diagram of another embodiment of a load stabilization system 600 suitable for use in a system, such as in the load stabilization control subsystem 114 of the system 100 illustrated in FIG. 1. The load stabilization system 600 comprises a first signal combiner 602, such as a multiplier, for receiving a signal corresponding to a rotor speed at a first input 604 and a signal corresponding to an estimated torque at a second input 606 and for producing an output 608.

The output 608 is electrically coupled to a first input 610 of a first low-pass filter 612. The first low-pass filter 612 receives a signal corresponding to a first time constant at a second input 614. The first low-pass filter 612 comprises an output 616. In an embodiment for a load stabilization system used in a vehicle, the signal corresponding to a time constant might correspond to 50 milliseconds.

The output 616 of the first low-pass filter 612 is electrically coupled to a first negative input 618 of an adder 620. The adder 620 has a second negative input 622 for receiving a signal corresponding to a loss of machine 118, which may include copper and iron losses. The adder 620 also comprises a positive input 624 for receiving a signal corresponding to a commanded level of power wasting and an output 626 for providing an output of the adder 620. The output of the adder 620 corresponds to an indication of a desired energy-wasting component of a flux current.

The output 626 of the adder 620 is electrically coupled to a first input 628 of a first bi-directional limiter 630. The first bi-directional limiter 630 comprises a second input 632 for receiving a signal corresponding to an upper limit of an incremental flux current, a third input 634 for receiving a signal corresponding to a lower limit of an incremental flux current, and an output 636. In one embodiment, the signal corresponding to upper limit of an incremental flux current corresponds to a power change of 200 watts of a first polarity and the signal corresponding to a lower limit of an incremental flux current corresponds to a power change of 200 watts of an opposite polarity. The upper and lower limits can be chosen so as to avoid an oscillating or unstable condition.

The output 636 of the first bi-directional limiter 630 is coupled to a first input 638 of a proportional and integral regulator 640. The proportional and integral regulator 640 comprises a second input 642 to receive a signal for controlling a proportional gain, a third input 644 to receive a signal for controlling an integral gain, and an output 646. In one embodiment, the signal for controlling the proportional gain might be set so as to produce a proportional gain of 2500 and the signal for controlling the integral gain might be set so as to produce an integral gain of 250.

The output 646 of the proportional and integral controller 640 is electrically coupled to a first input 648 of a second bi-directional limiter 650. The second bi-directional limiter 650 comprises a second input 652 for receiving a signal corresponding to a lower limit, a third input 654 for receiving a signal corresponding to an upper limit, and an output 656. In one embodiment, the signal corresponding to a lower limit might correspond to a minimum flux current and might be set so as to limit the wasting current to a current of at least 30 amps.

The third input 654 of the second bi-directional limiter 650 is electrically coupled to an output 658 of a second signal combiner 660, such as a multiplier. The second signal combiner 660 comprises a first input 662 for receiving a signal corresponding to a maximum flux current and a second input 664 for receiving a signal corresponding to a mode multiplier factor. In one embodiment the signal corresponding to a maximum flux current might be set so as to limit the flux current to a maximum of 400 amps. In one embodiment, the signal corresponding to a mode multiplier might correspond to a factor of one when machine 118 is operating in a first mode, such as a normal operation mode, and might correspond to a factor of ¼ if machine 118 is operating in a second mode, such as an LOS mode.

The output 656 of the second bi-directional limiter 650 is a signal corresponding to the amount of flux current required to waste the commanded level of energy wasting, subject to certain limitations as described above, and is electrically coupled to a switch 666. The switch 666 can be opened when it is desired to disable energy wasting.

The output 626 of the adder 620 also is electrically coupled to a first input 670 of a second low-pass filter 672. The second low-pass filter 672 receives a signal corresponding to a second time constant at a second input 674. In one embodiment, the signal corresponding to a second time constant might correspond to 500 milliseconds. The second low-pass filter 672 comprises an output 676, which is a signal corresponding to a capacity of machine 118 to waste energy over a period of time corresponding to the second time constant.

The output 676 of the second low-pass filter 672 is electrically coupled to a first input 678 of a comparator 680. The comparator 680 comprises a second input 682 for receiving a threshold value to be compared to the signal received at the first input 678 of the comparator 680. In one embodiment, the threshold value might be set to a value corresponding to 200 watts of energy wasting. The comparator 680 comprises an output 684, which is a logical flag. In the embodiment illustrated in FIG. 6, the output 684 of the comparator 680 may be FALSE when the capacity of machine 118 to waste energy is below a threshold energy level. In the embodiment illustrated in FIG. 6, the output 676 of the second low-pass filter 672 may have a positive value corresponding to a positive capacity of machine 118 to waste energy.

The output 684 of the comparator 680 is electrically coupled to a first input 686 of a NAND gate 688. A second input 690 of the NAND gate 688 receives a logical flag corresponding to a mode of machine 118, such as a speed limiting mode, which may also serve as an indication that machine 118 may be unable to waste a desired amount of energy. The NAND gate 688 has an output 692, which may be used by a machine, such as the system 100 illustrated in FIG. 1, to predict whether energy wasting in the windings of machine 118, such as the windings 124, 126, 128 of FIG. 1, will be sufficient to meet a desired amount of energy wasting.

Although specific embodiments of and examples for the load stabilization system and method are described herein for illustrative purposes, various equivalent modifications can be made without departing from the spirit and scope of the disclosure, as will be recognized by those skilled in the relevant art after reviewing the specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 10/738,926 filed Dec. 16, 2003, and entitled "POWER MODULE WITH HEAT EXCHANGE"; U.S. patent application Ser. No. 10/345,872 filed Jan. 15, 2003, and entitled "OVERMODULATION SYSTEMS AND METHODS FOR INDUCTION MOTOR CONTROL", which published on Sep. 4, 2003 under Publication No. 20030164028; U.S. patent application Ser. No. 10/861,319 filed Jun. 4, 2004, and entitled "INTERLEAVED POWER CONVERTER"; U.S. patent application Ser. No. 10/017,483 filed Dec. 14, 2001, and entitled "FUEL CELL SYSTEM SHUNT REGULATOR METHOD AND APPARATUS", which published on Jun. 19, 2003 under Publication No. 20030113600; U.S. Patent Application No. 60/592,776 filed Jul. 30, 2004, and entitled COOLING SYSTEM FAILURE DETECTOR and a February 1998 Texas Instruments Europe publication bearing Literature No. BPRA073 and entitled *Field Oriented Control of 3-Phase AC-Motors*, are incorporated herein by reference, in their entirety. Aspects of the present disclosure can be modified, if necessary, to employ systems, circuits and concepts of the various patents, applications and publications to provide yet further embodiments.

These and other changes can be made in light of the above-detailed description. In general, in the following claims, the terms used should not be construed to limit the claims to the specific embodiments disclosed in the specification and the claims. Accordingly, the claims are not limited by the disclosure.

The invention claimed is:

1. A system for stabilizing a load presented by a machine, the system comprising:
   means for determining whether load stabilization is desired that is configured to monitor a signal corresponding to a temperature and to selectively generate a control signal to adjust a flux current based at least in part on the monitored signal corresponding to the temperature; and
   means for stabilizing the load by wasting energy in at least one winding of the machine communicatively coupled to the means for determining whether load stabilization is desired.

2. The system of claim 1, further comprising:
   alternative means for stabilizing the load communicatively coupled to the means for determining whether load stabilization is desired.

3. The system of claim 1 wherein the load comprises a load presented to power source selected from the group consisting of a fuel cell stack, a battery array, a super-capacitor array and an ultra-capacitor array.

4. The system of claim 1 wherein the means for determining whether load stabilization is desired comprises a load stabilization control subsystem and the means for stabilizing the load by wasting energy in at least one winding of the machine comprises a current control subsystem.

5. The system of claim 1 wherein the means for determining whether load stabilization is desired determines whether load stabilization is desired based at least in part on an indication of a change in the load presented by the machine.

6. The system of claim 5 wherein the indication comprises an estimated torque of a rotor in the machine.

7. The system of claim 5 wherein the indication comprises a level of a throttle control signal.

8. The system of claim 5 wherein the indication comprises a measured change in the load.

9. The system of claim 1 wherein the means for determining whether load stabilization is desired is configured to monitor a signal corresponding to an operational mode of the machine and to generate a control signal to adjust a flux current based at least in part on the monitored signal corresponding to the operational mode of the machine.

10. The system of claim 1 wherein the means for determining whether load stabilization is desired is configured to generate a control signal to avoid an oscillating load condition.

11. The system of claim 1 wherein the means for determining whether load stabilization is desired comprises:
a proportional and integral controller; and
a comparator.

12. A system for stabilizing a load presented by a machine, the system comprising:
means for determining whether load stabilization is desired, wherein the means for determining whether load stabilization desired determines whether load stabilization is desired based at least in part on an indication that comprises an estimated change in the load; and
means for stabilizing the load by wasting energy in at least one winding of the machine communicatively coupled to the means for determining whether load stabilization is desired.

13. The system of claim 12 wherein the indication comprises a combination of a measured change in the load and the estimated change in the load.

14. A system for stabilizing a load presented by a machine, the system comprising:
means for determining whether load stabilization is desired that is configured to calculate a capacity for increasing a flux current and to calculate a desired increase in the flux current, and to generate a control signal to adjust the flux current based in part on a comparison of the calculated capacity for increasing the flux current and the calculated desired increase in the flux current; and
means for stabilizing the load by wasting energy in at least one winding of the machine communicatively coupled to the means for determining whether load stabilization is desired.

15. A system for stabilizing a load presented by a machine, the system comprising:
means for determining whether load stabilization is desired that is configured to calculate an increase in a flux current to achieve a desired amount of energy wasting, and to generate a control signal to adjust the flux current based in part on a comparison of the calculated increase in the flux current to a threshold value; and
means for stabilizing the load by wasting energy in at least one winding of the machine communicatively coupled to the means for determining whether load stabilization is desired.

16. A method of stabilizing a load presented by a machine, the method comprising:
receiving an indication that load stabilization is desired that comprises receiving a signal corresponding to an estimated torque of a rotor in the machine; and selectively wasting energy in at least one winding of the machine based at least in part on the received indication that load stabilization is desired.

17. The method of claim 16 wherein selectively wasting energy in at least one winding of the machine comprises controlling a flux current provided to the at least one winding of the machine.

18. The method of claim 16 wherein the load comprises a load presented to a power source selected from the group consisting of a fuel cell stack, a battery array, a super-capacitor array and an ultra-capacitor array.

19. The method of claim 16 wherein receiving an indication comprises receiving a throttle control signal.

20. The method of claim 16 wherein receiving an indication comprises receiving a signal corresponding to a measured change in the load.

21. The method of claim 16, further comprising:
monitoring an operational mode of the machine; and
controlling a flux current provided to the at least one winding of the machine based at least in part on the monitoring of the operational mode.

22. The method of claim 21 wherein monitoring an operational mode comprises monitoring a control signal.

23. The method of claim 16, father comprising:
monitoring an operational condition of the machine; and
controlling a flux current provided to the at least one winding of the machine based at least in part on the monitoring of the operational condition.

24. A method of stabilizing a load presented by a machine, the method comprising:
receiving an indication that load stabilization is desired that comprises receiving a signal corresponding to an estimated change in the load; and
selectively wasting energy in at least one winding of the machine based at least in part on the received indication that load stabilization is desired.

25. A method of stabilizing a load presented by a machine, the method comprising:
receiving an indication that load stabilization is desired;
selectively wasting energy in at least one winding of the machine based at least in part on the received indication that load stabilization is desired;
monitoring an operational condition of the machine comprising monitoring a sensor; and
controlling a flux current provided to the at least one winding of the machine based at least in part on the monitoring of the operational condition.

26. A method of stabilizing a load presented by a machine, the method comprising:
receiving an indication that load stabilization is desired;
selectively wasting energy in at least one winding of the machine based at least in part on the received indication that load stabilization is desired;
calculating a desired increase in a flux current;
calculating a capacity for increasing the flux current; and
controlling the flux current provided to the at least one winding of the machine based at least in part on the calculated desired increase in the flux current and the calculated capacity for increasing the flux current.

27. A method of stabilizing a load presented by a machine, the method comprising:
receiving an indication that load stabilization is desired;
selectively wasting energy in at least one winding of the machine based at least in part on the received indication that load stabilization is desired; and controlling a flux current provided to the at least one winding of the machine based at least in part on a threshold value.

28. The method of claim 27 wherein the threshold value corresponds to a minimum amount of energy wasting.

29. The method of claim 27 wherein the threshold value corresponds to a maximum amount of energy wasting.

30. The method of claim 27 wherein the threshold value corresponds to a minimum amount of flux current.

31. The method of claim 27 wherein the threshold value corresponds to a maximum amount of flux current.

* * * * *